UNITED STATES PATENT OFFICE.

TALIAFERRO P. SHAFFNER, OF LOUISVILLE, KENTUCKY.

IMPROVED PROCESS OF PRESERVING NITROLEUM AND OTHER EXPLOSIVE LIQUIDS.

Specification forming part of Letters Patent No. 98,426, dated December 28, 1869.

*To all whom it may concern:*

Be it known that I, TALIAFERRO P. SHAFFNER, of the city of Louisville, county of Jefferson and State of Kentucky, have made a new and useful Improvement in the Mode of Preserving Nitroleum, Nitro-Glycerine, and other Liquid Explosive Compounds; and I do declare the following to be a full and exact description thereof.

The nature of my invention or discovery consists in the use of sponge, or any known substance capable of absorbing liquids, finely cut or otherwise arranged, and with this prepared sponge or other substance, as aforesaid, I mix nitroleum, nitro-glycerine, or other liquid explosive substance, in such proportions as may be desired.

In this manner the nitroleum may be used for blasting purposes; but it may also be retained in absorption, for purposes of storing or transportation, as there would not be any risk of explosion. The particles of sponge or other equivalent matter would hold the nitroleum, and cushion it from blows that would ordinarily explode nitro-glycerine.

If desired, the nitroleum could be separated from the sponge or other equivalent substance by immersing the same in warm water. Sponge holding, by capillary attraction, nitro-glycerine will, when immersed in warm water—say, 60° Fahrenheit—cease to hold it, as the specific gravity of the nitro-glycerine will cause it, when immersed in warm water, as aforesaid, to let go and fall to the bottom of the vessel containing the said sponge, holding the nitro-glycerine and warm water.

I am aware that liquids have been used for like purposes, such, for example, as the spirit of wood, which, when subjected to a treatment of warm water, separates from the nitro-glycerine and passes off with the water. Nor do I claim that this is the only process of effecting the same end hereinbefore described, as the mixture of nitro-glycerine with silicious matter, and also various salts, can be in like manner treated, and a separation of the nitro-glycerine and the silicious matter or salts will take place; but in the above-named case there is a rigidity of the silicious matter, while on the other hand the sponge or other equivalent porous substances—such, for example, as india-rubber, prepared for and to serve as an absorbent—will yield to pressure, and more readily take up the warm water and discharge the nitro-glycerine.

The india-rubber may be the known prepared vulcanized substance made by the expansion of matter, and cellified, so as to approximate, as an absorbent, sponge or fiber matter.

The quantity of the parts may be thus mentioned, namely: One pound of sponge, mixed with five pounds, more or less, of nitro-glycerine. The sponge should be well cleaned before being treated with the nitro-glycerine, by any of the known processes. Water may be applied with the said nitroleum and sponge, which will serve to take up any acid that might be remaining in the nitro-glycerine.

In case the nitro-glycerine is separated from the sponge, as hereinbefore described, which may be done at any time and place, the sponge can be again used for the same purpose indefinitely.

Having now fully described the nature of my invention sufficiently clear and exact to enable one skilled in the arts to make and use the same, what I claim, and desire to secure by Letters Patent, as my invention or discovery, is—

The use of sponge or other equivalent elastic porous substance to hold in suspension, by capillary attraction, nitro-glycerine or other equivalent explosive liquid, for the purpose of storing or transportation, in the manner and substantially as hereinbefore described.

TAL. P. SHAFFNER.

Witnesses:
 MERWIN DEVEAU,
 NATHANIEL GILL.